(12) United States Patent
Parker

(10) Patent No.: US 6,832,313 B1
(45) Date of Patent: Dec. 14, 2004

(54) MIGRATION FROM IN-CLEAR TO ENCRYPTED WORKING OVER A COMMUNICATIONS LINK

(75) Inventor: Thomas Anthony Parker, Calne (GB)

(73) Assignee: Fujitsu Services Limited, Slough (GB)

(*) Notice: Subject to any disclaimer, the term of this patent is extended or adjusted under 35 U.S.C. 154(b) by 845 days.

(21) Appl. No.: 09/585,665

(22) Filed: Jun. 1, 2000

(30) Foreign Application Priority Data

Jul. 21, 1999 (GB) .............................................. 9916955

(51) Int. Cl.[7] .......................... H04L 9/12; H04L 12/46; H04K 1/00
(52) U.S. Cl. ...................... 713/150; 713/153; 713/156; 713/200; 713/201
(58) Field of Search ............................... 713/150, 153, 713/156, 200, 201

(56) References Cited

U.S. PATENT DOCUMENTS

| | | | | |
|---|---|---|---|---|
| 4,091,423 A | * | 5/1978 | Branscome | 380/244 |
| 4,369,332 A | * | 1/1983 | Campbell, Jr. | 380/43 |
| 4,815,128 A | | 3/1989 | Malek | 380/9 |
| 5,077,791 A | | 12/1991 | Salihi | 380/23 |
| 5,214,698 A | * | 5/1993 | Smith et al. | 380/280 |
| 5,428,686 A | * | 6/1995 | Brown et al. | 380/46 |
| 5,579,394 A | | 11/1996 | Waldron | 380/49 |
| 5,594,798 A | | 1/1997 | Cox | 380/49 |
| 5,822,434 A | | 10/1998 | Caronni | |
| 6,092,200 A | * | 7/2000 | Muniyappa et al. | 713/201 |
| 6,158,011 A | * | 12/2000 | Chen et al. | 713/201 |
| 6,173,399 B1 | * | 1/2001 | Gilbrech | 713/153 |
| 6,175,917 B1 | * | 1/2001 | Arrow et al. | 713/1 |
| 6,226,748 B1 | * | 5/2001 | Bots et al. | 713/201 |
| 6,226,751 B1 | * | 5/2001 | Arrow et al. | 713/201 |
| 6,353,886 B1 | * | 3/2002 | Howard et al. | 713/156 |
| 6,363,154 B1 | * | 3/2002 | Peyravian et al. | 380/283 |
| 6,430,691 B1 | | 8/2002 | Di Santo | |
| 6,483,919 B1 | * | 11/2002 | Lund et al. | 380/247 |

FOREIGN PATENT DOCUMENTS

| | | |
|---|---|---|
| EP | 0784392 A2 | 7/1997 |
| WO | WO 98/19243 | 5/1998 |
| WO | WO 98/27783 A1 | 6/1998 |

* cited by examiner

*Primary Examiner*—Gregory Morse
*Assistant Examiner*—Tongoc Tran
(74) *Attorney, Agent, or Firm*—Barnes & Thornburg

(57) ABSTRACT

A system involving a central computer (2) and a remote computer (3), which can communicate over a link (1), is migrated from in-clear working to encrypted working automatically as the computers receive and install long term keys necessary for encrypted communication. When migration is required, the settings at both ends of the link need to be changed to "encrypt" simultaneously and, particularly, if there are numerous remote computers and the possibility of connection of a remote computer to different central computers, as is possible in virtual private network (VPN) scenarios, severe problems can ensue. Hence, as well as the normal two modes of working "in-clear" and "encrypt", a third mode in which "initiate encryption" is set at one end of the link and "accept encryption" is set at the other end of the link is proposed. This third mode ensures that working in-clear can continue over a particular link, such as between a particular VPN server and a particular gateway PC, until a long term key required for encrypted working is installed at both ends of the link, but that once key installation is complete, only encrypted working is possible over that link.

2 Claims, 1 Drawing Sheet

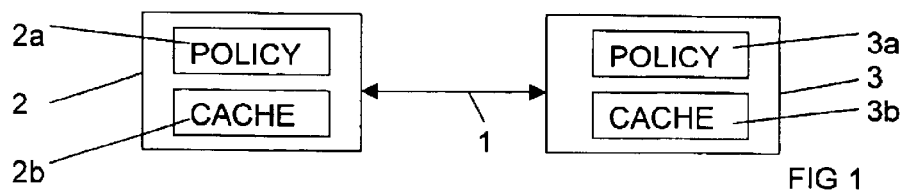
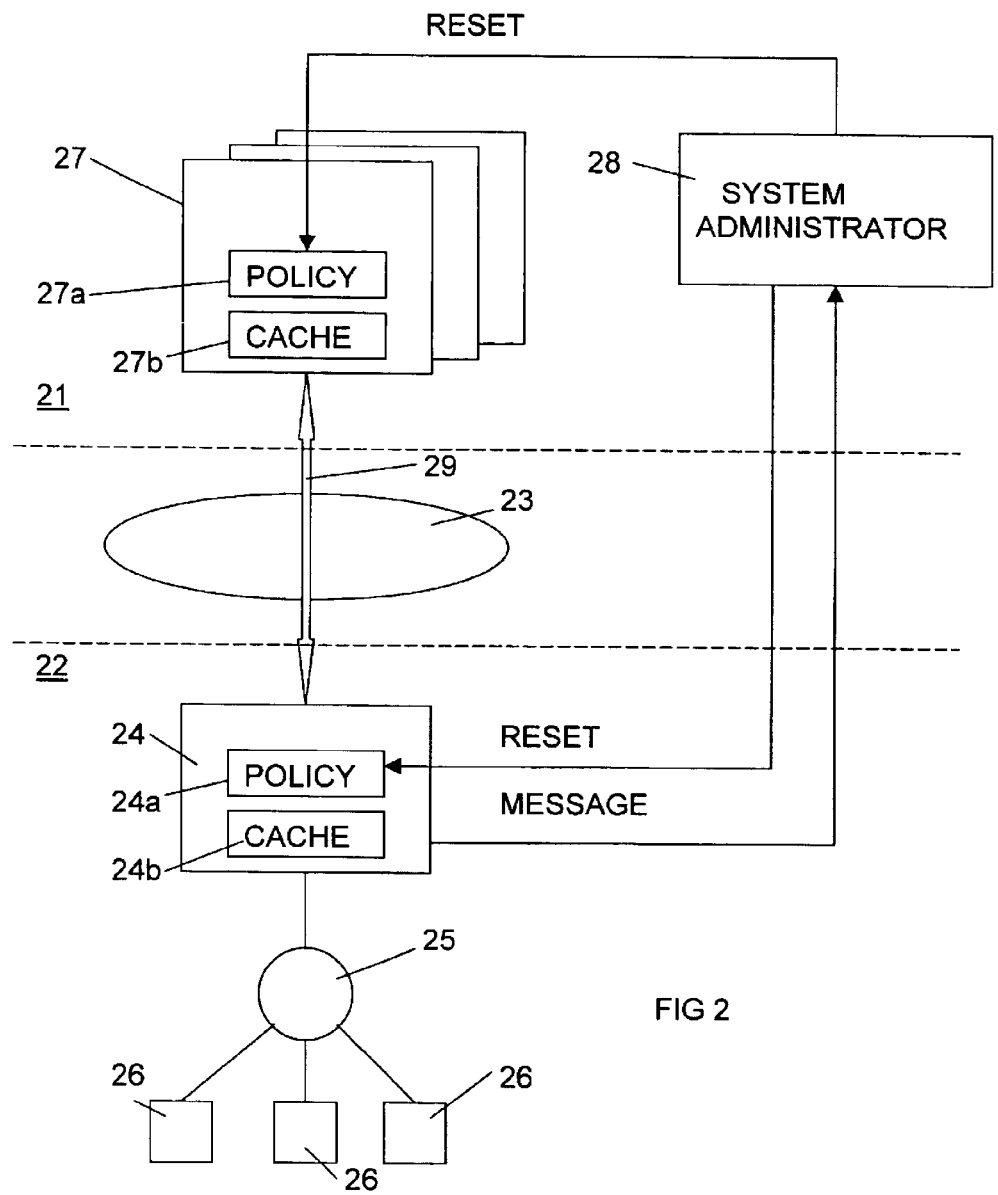

MIGRATION FROM IN-CLEAR TO ENCRYPTED WORKING OVER A COMMUNICATIONS LINK

BACKGROUND OF THE INVENTION

This invention relates to a method and means permitting migration from in-clear working over a communications link, to encrypted working and in particular, but not exclusively, to migration from in-clear working over a network to encrypted virtual private network (VPN) working.

A VPN is a network of connections between a number of sites that has the appearance of being dedicated and private to these sites but actually can be implemented over a shared network such as the Internet.

SUMMARY OF THE INVENTION

According to one aspect of the present invention there is provided a computer system comprising a first node, a second node and a communications link connecting the first node and the second node, and wherein initially the system is capable of working in a plurality of modes, including a first mode corresponding to in-clear working over the link, a second mode corresponding to encrypted working over the link, and a third mode, employed for migration from in-clear to encrypted working over the link, and wherein the third mode provides in-clear working until means required for encrypted working are provided at both the first and the second nodes, when encrypted working is commenced and from which point in time only encrypted working is possible over the link.

According to a second aspect of the present invention there is provided a computer system comprising a first node, a second node and a communications link connecting the first node and the second node, wherein the system is initially capable of operating in a plurality of modes, including a first mode corresponding to in-clear working over the link, a second mode corresponding to encrypted working over the link, and a third mode, employed for migration from in-clear working over the link to encrypted working over the link, in which one said node is set to "initiate encryption" and the other said node is set to "accept encryption", and wherein the third mode provides in-clear working until means required for encrypted working are installed at both the first and the second nodes, when encrypted working is provided over the link and from which point in time only encrypted working is possible over the link.

According to another aspect of the present invention there is provided a computer system capable of operation as a virtual private network (VPN) including at least one central server and at least one remote client connectable by a shared network, wherein the or each server and the or each client include respective security policy files with settings of "in-clear", "initiate encryption" or "accept encryption", and "encrypt" for information to be transmitted therebetween, "in-clear" corresponding to a mode of operation comprising working in-clear, "encrypt" corresponding to a mode of operation comprising encrypted VPN working over the network, and "initiate encryption" or "accept encryption", being employed for a mode of operation when migration from in-clear to encrypted VPN working is required, which migration mode provides in-clear working until authentication keys required for encrypted working are installed at both ends of a particular server/client link across the network, when encrypted VPN working is provided for said link and from which point in time only encrypted working is possible over said link.

According to yet another aspect of the present invention there is provided a method for use in migrating operation of a computer system from in-clear working to encrypted working, the computer system comprising a first node, a second node and a communications link connecting the first and second nodes, the computer system initially being capable of operating in a plurality of modes including "in-clear" mode, migration mode having settings of "initiate encryption" or "accept encryption", and "encrypt" mode, means enabling encrypted working being required to be installed at the first and second nodes before encrypted working can commence, the method including the steps of installing said means at the first node, setting the first node to "initiate encryption", setting the second node to "accept encryption", as a result of which messages transmitted between said nodes are transmitted in-clear, subsequently installing said means at the second node, as a result of which messages between the nodes are transmitted encrypted, and setting the first and second nodes to "encrypt" mode whereby only encrypted working is subsequently possible over the link.

According to a still further aspect of the present invention there is provided a method for use in migrating operation of a computer system, comprising at least one central server and at least one remote client connectable by a shared network, from in-clear working to virtual private network (VPN) working, including the step of providing the or each server and the or each client with respective security policy files having settings for "in-clear", "initiate encryption" or "accept encryption", and "encrypt" for information to be transmitted therebetween, "in-clear" corresponding to a mode of operation comprising working in-clear, "encrypt" corresponding to a mode of operation comprising encrypted VPN working over the network, and "initiate encryption" or "accept encryption" corresponding to a mode of operation which is employed when migration from in-clear to encrypted VPN working is required and which provides in-clear working until authentication keys required for encrypted working are installed, and including the steps of setting the policy file on the server of a particular link to "initiate encryption" and setting the policy file on the client of said particular link to "accept encryption" when migration is required, installing the authentication key at the server of said particular link, messages between the server and the client of the particular link thereby being transmitted in clear, subsequently installing the authentication keys at the client of said particular link whereby encrypted VPN working commences instead of in-clear working, and resetting the security policy files of the server and client of said particular link to "encrypt" whereby only encrypted working is subsequently possible over said link.

BRIEF DESCRIPTION OF THE DRAWINGS

Embodiments of the invention will now be described with reference to the accompanying drawings in which:

FIG. 1 is a schematic drawing of two computer systems with a communications link therebetween and capable of operating according to an embodiment of the present invention, and FIG. 2 is a highly schematic drawing of a VPN capable of operating according to an embodiment of the present invention.

DESCRIPTION OF THE PREFERRED EMBODIMENTS

In FIG. 1 there is shown a communications link 1 between two computer systems (nodes) 2 and 3. Initially the link may operate without encryption, that is in-clear working. The invention is concerned with migrating that in-clear working to encrypted working. Subsequent to migration, only encrypted working is to be possible.

Messages over the communications link 1 are to be encrypted using symmetric encryption. In symmetric encryption the same key is used to decrypt the data as was used to encrypt it. This key must be known both to the sender and the recipient but no-one else. Preferably, the shared knowledge of this message encryption key is achieved by one party (node) creating or obtaining the key and transmitting it securely to the other party (node) under the cryptographic protection of a pre-established long term key, typically, but not necessarily, an asymmetric cryptographic key. Once a message encryption key has been established it can be cached at either end of the link so that a large number of remote sites are required to communicate with a small central set of VPN gateways, as is described in more detail hereinafter, it is appropriate for the central end of the link to support the "initiate encryption" option, and the remote end the "accept encryption" option.

Referring now to Table 1, which is a decision table used for message arrival or transmission events, the operation of the invention will be described. Each node may be in one of the policy modes introduced above, may receive a request to transmit a message, and may be presented with an incoming message that can be in clear or encrypted. Either both or neither of the nodes can have a message key cache, 2b and 3b in FIG. 1.

TABLE 1

| MODE | LONG TERM KEY | KEY IN CACHE | CLEAR MESSAGE RECEIVED | ENCRYPTED MESSAGE RECEIVED | SEND MESS REQST | KEY REQUEST RECEIVED |
|---|---|---|---|---|---|---|
| Encrypt | Yes | Yes | Discard | Decrypt OK | Encrypt & send | Establish |
| Encrypt | Yes | No | Discard | Discard and request key | Request key and encrypt if OK | Establish |
| Encrypt | No | No | Does not occur | Does not occur | Does not occur | Does not occur |
| Initiate | Yes | Yes | Accept (Drop msg key) | Decrypt OK | Encrypt & send | Establish |
| Initiate | Yes | No | Accept | Discard and request key | Request key and encrypt & send if OK | Establish |
| Initiate | Yes | Special | Accept | Discard and request key | Send in clear | Establish |
| Initiate | No | No | Accept | Discard | Send in clear | Return error |
| Accept | Yes | Yes | Discard | Decrypt OK | Encrypt & send | Establish |
| Accept | Yes | No | Accept | Discard and request key | Request key and encrypt & send if OK | Establish |
| Accept | No | No | Accept | Discard | Send in clear | Return error |
| In clear | Yes | Yes | Accept | Unusable | Send in clear | Not significant |
| In clear | Yes | No | Accept | Unusable | Send in clear | Not significant |
| In clear | No | No | Accept | Unusable | Send in clear | Return error | it can immediately be used for encrypting transmitted messages and decrypting received messages.

In asymmetric encryption, data is encrypted with one key and decrypted with another. The first of these is known as the Public Key. The other is a Private Key. Only the owner of the Private Key can decrypt data encrypted with the Public Key. Thus anyone can encrypt a message using the Public Key and be sure that the encrypted message can be decrypted only by the intended recipient. On the other hand, if the owner of a Private Key encrypts a piece of data using that Private Key, it can be decrypted by anyone using the Public Key. The fact that the decryption process yields some valid data proves that the original message came from the owner of the Private Key, and thus the encrypted data can be construed as a "signature" of the Private Key owner. Protocols to establish symmetric keys under the protection of asymmetric keys can use both of these techniques to achieve both protection of the symmetric key and authentication of its origin.

Prior to the migration each node 2 and 3 operates in an "in-clear" mode, whereas after the migration each node is required to operate in an "encrypt" mode. For the purposes of the migration an additional mode is proposed. This corresponds to "initiate encryption" or "accept encryption". If the node at one end of the link 1 offers the "initiate encryption" option, then the node at the other end of the link must offer the "accept encryption" option. The mode in use at a node may be controlled by policy settings in respective policy files 2a, 3a of the nodes. In the case of a VPN in which Notes:
1. If message key caching is not supported, the entries and actions involving the cache should be ignored.
2. "Does not occur" indicates that it would not be sensible to establish a mode of "encrypt" without first installing a long term key with which message keys can be established.
3. "Establish" indicates that the nodes engage in a message encryption key establishment protocol involving the long term key, followed by caching of the established key where caching is supported.
4. "Unusable" indicates that the incoming encrypted message may or may not be checked for, but if it is not discarded it will not be decipherable and so cannot be interpreted.
5. "Not Significant" indicates that it does not matter whether the request results in a message key being established or not.

The main entries in Table 1 are described in narrative form below. The narrative is expressed in terms of a caching being supported, but it is straightforward to interpret it for the case of no support for caching.
1. Message transmitters and receivers operating in "in clear" mode will transmit, and expect to receive, messages in clear. Any encrypted incoming messages will be indecipherable.
2. A message transmitter ("transmitter") operating in a mode other than "in clear" and possessing a long term key, but with no key present in the message key cache (i.e. no "cached key"), will attempt to perform the exchanges necessary with the other party to establish the message key and cache it. There are the following possible outcomes:

if a response successfully establishing the message key, using a valid long term key, is received, the (normal) message key value thus established is cached at both ends and the message to be sent is encrypted. In fact, everything happens as if the mode were "encrypt", if the policy is "accept encryption", a failure to establish a message key is treated as if the policy were "encrypt", if the policy is "initiate encryption" and any kind of error response is received, the data is transmitted in clear, as if "in clear" were the policy, the message being transmitted as it arrived. A special message key value is cached indicating that no message key was able to be established. Any messages that had been held in a message cache during the failed message key establishment are released (in clear) immediately after the establishment has failed.

(The above two last items contain the only rules that are different for the "initiate encryption" and "accept encryption" policy variants.)

3. A transmitter finding a special message key value in the cache, indicating that it has already failed to establish a normal message key, simply sends the message in clear as it arrived. It does not attempt to establish a message key and will not do so until, for example, it is rebooted and the cached special value is lost, although it will respond positively to any key establishment requests initiated from the other end.

4. A transmitter with a normal message key available, and by implication also having a long term key, will send the massage encrypted as if the policy were "encrypt". If the other node has lost its message key and the exchanges to establish a new message key fail, transmission will fail along the same lines as if the setting had been "encrypt" and no message key had been able to be established.

5. A transmitter without a long term key will send in clear as if the policy were "in clear".

6. A receiver with a long term key will respond to a request to establish a fresh message key with the normal response establishing the key, acting as if the policy was "encrypt".

7. A receiver with a message key receiving an encrypted message will act in every way as if the policy setting was "encrypt", in particular it will decrypt the message using the message key.

7a. A receiver with a message key and a policy setting of "initiate encryption", upon receipt of a clear message, will accept the message and discard the message key. The receiver will then operate on following messages according to rule 8 below.

8. A receiver operating in a mode other than "in clear" and without a message key will accept incoming messages and deal with them according to their type and according to its own mode. Specifically, if they are encrypted and the receiver has a long term key, it will act as though the policy was "encrypt" and try to establish a new message key though the incoming messages will be indecipherable since they are encrypted under an old message key lost to the receiver. If they are encrypted and the receiver has no long term key, the incoming message will be indecipherable. If they are in clear and the mode is not "encrypt", it will act as though the policy were "in clear" and pass them transparently.

An example of a link between a remote node 3 and a central node 2 being migrated from in clear working to encrypted working will now be described.

1. The software supporting the invention is supplied to the central node 2 without a long term key. The policy mode there is set to "in clear".

2. The software supporting encryption is supplied to the remote node 3 without a long term key. The policy mode there is set to "accept encryption". At this stage all message traffic is exchanged in clear.

3. A long term key is established by out of band means at the central node 2 and at the same time its policy mode is set to "initiate encryption". At this stage it will now accept in-clear messages. When it is first asked to transmit a message it will attempt to establish a message key but this will fail since the remote node 3 has no long term key, so it will transmit messages in clear. It will store the special value of the message key, referred to above, in the message key cache 2b and will continue to transmit in clear until this value is changed.

4. Some time later, after verifying that the long term key installation at the central node 2 was successful, a long term key is installed at the remote node 3. The remote node will continue to accept in-clear messages from the central node until a message key has been established. It will also now accept key requests and any subsequent incoming encrypted traffic. Alternatively, if the remote node transmits a message before receiving such a key request, it will itself issue a key request, which will succeed, and subsequent traffic will be encrypted (a successful key request will cause any special cached key value to be replaced with the now established value). If the work environment is such that the remote node never initiates transmissions, the special value in the message key cache can be cleared at any time, either by a direct overwrite action or by a reboot of the central node (if the remote installation had failed or had not yet been attempted, the special value will automatically be reinstated next time the central node attempts to send a message). In the event that a successful key request is made but then the remote node, for other reasons, has to 'rollback' the VPN software, upon receipt of clear messages from the remote node the control node will clear its message key.

5. In due course, when the system administrator knows that the long term key has been installed at the remote node 3, the mode at each end of the link is changed to "encrypt". All message traffic between the nodes 2 and 3 is now always encrypted. Note that successful installation at the remote node 3 can be detected by the presence of a valid normal message key in the central node's cache 2b and that the 'rollback' ability is now disabled.

It will be apparent that manual involvement is not an essential aspect of this process and the possibility of failure through lack of synchronisation is eliminated. The solution proposed permits migration from in-clear working to encrypted working with no need to synchronise long term key delivery to either of the communicating parties.

The solution is suitable for use under the following conditions:

1. Where message key establishment is conducted dynamically under the protection of long term keys using a suitable cryptograhic key establishment protocol, such as X.509.

2. Where, between any two communicating parties, each of which could initiate a crypto message (initiating parties), it is predictable which party will receive its long term key first. One context to which this characteristic applies is a network consisting of a central security server that communicates with a community of remote satellites (for example laptop computers) over encrypted channels, none of which communicate directly with each other. An extension of this configuration to which this characteristic also applies is one where there are multiple central security servers shared amongst the remote sites, but which either do not communicate with each other over encrypted channels or for which the synchronised introduction of long term keys amongst each other poses no problems.

3. Where, in the absence of a sufficiently large message cache, it is acceptable that a few individual data packets might be lost on the communications link during message key establishment, on the grounds that there is a packet recovery protocol level higher than the message key establishment protocol. An example of an acceptable situation is one where message keys are established at the IP level, and packets recovered by TCP or an application level protocol.

The solution caters for networks in which any party might be an initiating party. The solution permits non-initiating parties to become initiating ones once the migration from in-clear working to encrypted working is complete, i.e. all parties have a long term key. During migration the solution permits a party to be an initiating one over one link and a non-initiating one over another. The solution configuration can be fully secured by management action on an individual link basis—for each link, as soon as it has had a long term key installed at both ends. There is no need to wait until migration has been completed for the whole network before performing a securing operation on an individual link.

Referring to FIG. 2, the invention as applied to a VPN will now be described.

There is a central site 21 in communication with remote sites, such as 22, over a shared network 23. The remote site 22 includes a security gateway 24 (client) to a LAN 25, which has three personal computers (PCs) 26 on it. The gateway may also be a PC. Communications between the PCs 26 and PC 24 over the LAN 25 may or may not be separately encrypted. The central site includes at least one VPN server (central server) such as 27 together with a system administrator 28. When the VPN is fully implemented communication between the VPN server 27 and the gateway PC 24 is encrypted and takes place via tunnel 29 over the shared network 23. The VPN server 27 and gateway PC 24 both include respective policy files 27a, 24a and caches 27b, 24b. Tunnelling is the encapsulation of a data packet, for example an IP (Internet Protocol) packet inside another IP packet, after encrypting the data packet. The outer packet has a different destination IP address from the inner one and is used to direct the inner encrypted packet to a VPN security gateway at a site, where the outer layer can be stripped off, the inner packet decrypted and sent to its appropriate destination within the site.

In the case of migration from in-clear to encrypted working, the entries of the policy files, such as 24a and 27a, at both ends of a link would, in the absence of the invention, have to be changed simultaneously from "in-clear" to "encrypt". If there are numerous remote sites 22 for which migration is required, and if each remote site may interact with a different VPN server 27 at different times, then severe problems can arise with the synchronisation of such a migration. If a change is made, by mistake, at one end but not the other, a remote site can become out of contact.

The policy files referred to above can indicate either that encryption is not to be done, or that it is to be done. This is done on an individual IP address basis, each PC connected to LAN 25 having a different IP address, and each VPN server having a different IP address. In order to overcome problems involved with migration, it is proposed that policy settings between the extremes of encryption is not to be done or is to be done are supported, that is an additional mode of operation is supported. In particular, there is a mode with an "initiate encryption" or "accept encryption" policy. The first mentioned policy may be used at the central VPN server 27, where key changes in a migration to VPN are made first, and the second mentioned policy may be used at each remote site. Individual policy file entries may be set for either policy. The policies are almost identical but have slightly different effects, and in fact are matching halves of the same policy. The policy is only used transiently, the aim being to convert to full mandatory use of encryption as soon as possible after it has been established that both ends have a long term key. It is also possible that a different migration procedure would make it desirable to set the "initiate encryption" policy at the remote sites and "accept encryption" at the central ones. However, the example described here does not describe this option any further.

As discussed above, VPNs involve a shared message key, which is used for symmetric encryption of the message traffic. If a large system is being migrated to VPN working, it may take some time to deliver private keys to all remote sites and install them, and until that is achieved VPN working will clearly not be possible.

The central VPN server, such as 27, when transmitting to a remote site PC such as 24, in the "initiate encryption"/ "accept encryption" mode of operation, attempts to establish a message key with the remote site. The remote site is quite likely at this stage not to have a private key. If this is the case, the attempt to establish a message key will fail, and the central server 27 does not try again, but simply sends the message (data packets) transparently in clear. This will continue to happen until either the cache 27b of the central server 27 is reloaded, which causes it to forget that it had tried once, or until the remote site initiates establishing a message key, which it can do when it has received and had installed its long term key. The remote site sends and accepts data in clear until the arrival of its long term key. In-clear data is accepted at the central server because of the policy.

In due course, a long term key is delivered to the remote site and installed there. VPN central servers such as 27 may still be transmitting in clear because they remember their earlier failure to establish a message key, but because of the new policy the remote site will still accept them. It will also accept any requests to establish a message key and conduct encrypted and tunnelled sessions for incoming messages packets, since it now has a long term key with which a message key can be established. It will also, from now on, insist on establishing a message key when transmitting data, and on transmitting only encrypted tunnelled messages (packets). It can afford to do this because it knows that the VPN central servers already have long term keys with which they should be able to do this. This is the reason for the "initiate" and "accept" policy distinction, "initiate" being related to the VPN central servers where the key changes needed to move to VPN are made first, and "accept" being related to the remote sites.

Installation of the long term key at remote site 24 can cause a message to be sent to the system administrator 28. Whilst indicated as occurring over a separate path for reasons of drawing clarity, the message will actually be sent over the shared network 23 in a conventional manner. Alternatively, the administrator could use the fact of the presence of the central server of a normal message key for the remote site, as an indication that the long term key was successfully installed and that a PING style message had been transmitted back to establish the message key. The administrator 28 then first resets the policy in the policy file 27a on the central server 27. If this succeeds, the administrator 28 then resets the policy in the policy file 24a on the remote PC 24. In all cases, the resets change the policy to "encrypt".

As will be appreciated from the above, the invention is applicable to links whose symmetric encryption keys are dynamically established using a protocol that requires pre-delivered long term asymmetric keys to be present at each end. Advantage is taken of the system administrator knowing which end of the link will have its long term key installed first. It is particularly effective in the context of links from a central campus to a large number of remote stations where successful initial delivery of remote long term keys is difficult to guarantee and difficult to time, but where the central long term keys can be assuredly installed beforehand. An example of such a context is a Virtual Private Network (VPN) in which a large number of remote sites are required to communicate with a small central set of VPN gateways, but not directly with each other.

A protocol is used which requires a long term key to be established by out of band means at each end of the link. Under the long term key, the message encryption key, or a key from which such a key can be derived, can be established. An example of such a protocol might be an X.509 standard authentication protocol using asymmetric key pairs at each end of the link. The protocol starts with a request to establish a message encryption key ("key request"). A key request can originate from either node, depending on circumstances. If a backlog of messages to be processed builds up during the message key establishment protocol, they may be optionally cached. Once a message encryption key has been established, it can optionally be cached at each end of the link so that it can immediately be used for encrypting transmitted messages and decrypting received messages when present, without engaging in the key establishment protocol mentioned above. A cached message key can take a special value at the node supporting the "initiate encryption" mode.

In the VPN context, the invention provides a method and means of migrating a computer system, comprising a central site, including one or more VPN servers and a plurality of remote sites including security gateways, which sites can communicate with one another over a shared network, from in-clear working to encrypted VPN working gradually and automatically as the sites receive and install long term keys needed for communication over the network. The VPN servers and security gateways each include security policy files which include settings for "encrypt", "in clear", and "initiate encryption" or "accept encryption". Each VPN server has an "initiate encryption" setting for each gateway that it can communicate with, and each gateway has an "accept encryption" setting for each VPN server that it can communicate with. The "initiate" and "accept" policy varieties ensure that working in-clear can continue over a particular link, between a particular VPN server and a particular gateway, until the long term keys are installed at the gateway, i.e. at both ends of the link, when encrypted working over that particular link commences automatically, and the policy setting is changed to "encrypt" at both ends of that particular link. In the example described with reference to FIG. 2, communication is over a VPN tunnel. However, this is not the only possibility. A VPN without tunnelling could alternatively have been described.

I claim:

1. A computer system comprising a first nodes, a second node and a communication link connecting the first node and the second node, wherein:

(a) the system is initially capable of operating in a plurality of modes, including a first mode corresponding to in-clear working over the link, a second mode corresponding to encrypted working over the link, and a third mode, employed for migration from in-clear working over the link to encrypted working over the link, in which said first node is set to "initiate encryption" and said second node is set to "accept encryption";

(b) the third mode provides in-clear working until means required for encrypted working are installed at both the first and the second nodes, when encrypted working is provided over the link and from which point in time only encrypted working is possible over the link;

(c) the means required for encrypted working comprise a long term key, which long term key is used to establish a message encryption key to be employed by the first and the second nodes for encryption and decryption of messages transmitted over the link;

(d) the first and second nodes include respective caches in which said message encryption key is stored upon its establishment; and (e) when there is a failure to establish a said message encryption key a special key value is cached in the cache of said first node, the presence of which special key value serves to suspend attempts to establish a said message encryption key.

2. A computer system as claimed in claim 1 wherein each said node includes policy files for controlling setting the system to one of three modes of operation.

* * * * *